United States Patent
Ling et al.

(10) Patent No.: US 8,766,849 B2
(45) Date of Patent: Jul. 1, 2014

(54) GPS-ASSISTED SOURCE AND RECEIVER LOCATION ESTIMATION

(75) Inventors: Curtis Ling, Carlsbad, CA (US); Stuart Strickland, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 12/839,362

(22) Filed: Jul. 19, 2010

(65) Prior Publication Data

US 2011/0169697 A1    Jul. 14, 2011

Related U.S. Application Data

(60) Provisional application No. 61/226,629, filed on Jul. 17, 2009.

(51) Int. Cl.
*G01S 19/48*    (2010.01)
*G01S 1/02*    (2010.01)

(52) U.S. Cl.
USPC ................ 342/357.31; 342/464

(58) Field of Classification Search
USPC .............. 342/357.29, 357.31, 463–464
See application file for complete search history.

(56) References Cited

U.S. PATENT DOCUMENTS

| | | | |
|---|---|---|---|
| 5,706,010 A | 1/1998 | Franke | |
| 5,890,068 A | 3/1999 | Fattouche et al. | |
| 6,330,452 B1 | 12/2001 | Fattouche et al. | |
| 7,127,257 B2 * | 10/2006 | Riley et al. | 455/456.1 |
| 7,307,665 B2 | 12/2007 | Opshaug et al. | |
| 7,576,692 B2 * | 8/2009 | Sairo et al. | 342/386 |
| 7,636,061 B1 | 12/2009 | Thomas et al. | |
| 7,737,893 B1 | 6/2010 | Furman et al. | |
| 7,844,237 B2 * | 11/2010 | Cheung et al. | 455/166.1 |
| 8,102,317 B2 | 1/2012 | Lee et al. | |
| 2004/0242234 A1 * | 12/2004 | Klenner | 455/446 |
| 2007/0013584 A1 | 1/2007 | Camp | |
| 2007/0042790 A1 | 2/2007 | Mohi et al. | |
| 2007/0050824 A1 | 3/2007 | Lee et al. | |
| 2008/0040029 A1 | 2/2008 | Breed | |
| 2009/0043504 A1 | 2/2009 | Bandyopadhyay et al. | |
| 2009/0046593 A1 | 2/2009 | Ptasinski et al. | |
| 2009/0180451 A1 | 7/2009 | Alpert et al. | |

OTHER PUBLICATIONS

International Search Report of the International Searching Authority for Application No. PCT/US2010/040985, mailed on Sep. 14, 2010, 2 pages.

(Continued)

*Primary Examiner* — Cassie Galt
(74) *Attorney, Agent, or Firm* — Kilpatrick Townsend & Stockton LLP

(57) ABSTRACT

A mobile communication device includes, in part, a first wireless receiver adapted to determine, as it travels along a path, a multitude of positions of the mobile communication device using signals received from a primary positioning source, a second wireless receiver adapted to receive signals from one or more ambient wireless sources as the mobile communication device travels along the path, and a positioning module. An internal or external memory stores estimated positions and corresponding time references of the signals of the one or more ambient sources. The positioning module uses the data stored in the database to estimate the position of the mobile communication device when no primary positioning source signal is available. The positioning module optionally uses the data stored in the database to improve estimates of the position of the mobile communication device when primary positioning signal is available.

22 Claims, 2 Drawing Sheets

(56) References Cited

OTHER PUBLICATIONS

Written Opinion of the International Searching Authority for Application No. PCT/US2010/040985, mailed on Sep. 14, 2010, 5 pages.
International Search Report of the International Searching Authority for Application No. PCT/US2010/042490, mailed on Sep. 16, 2010, 2 pages.
U.S. Appl. No. 12/830,245, filed Jul. 2, 2010, Ramesh.
Written Opinion of the International Searching Authority for Application No. PCT/US2010/042490, mailed on Sep. 16, 2010, 7 pages.
Non-Final Office Action for U.S. Appl. No. 12/830,245, mailed on Jun. 4, 2012, 15 pages.
International Preliminary Reprot on Patentability and Written Opinion for PCT Application No. PCT/US2010/040985 mailed on Jan. 12, 2012; 7 pages.
International Preliminary Report on Patentability and Written Opinion for PCT Application No. PCT/US2010/042490 mailed on Jan. 26, 2012; 9 pages.

\* cited by examiner

GPS-ASSISTED SOURCE AND RECEIVER LOCATION ESTIMATION

CROSS-REFERENCES TO RELATED APPLICATIONS

The present application claims benefit under 35 USC 119 (e) of U.S. provisional application No. 61/226,629, filed Jul. 17, 2009, entitled "GPS-Assisted Source and Receiver Location Estimation," the content of which is incorporated herein by reference in its entirety.

The present application is related to and claims benefit to U.S. application Ser. No. 12/830,245, filed Jul. 2, 2010, the content of which is incorporated herein by reference in its entirety.

BACKGROUND OF THE INVENTION

Traditional means of location estimation using a wireless receiver and known beacons, as is implemented in a traditional GPS system, require knowledge of the position of four or more beacons and the distance of the receiver from each beacon. Three beacons may be used if assumption about location on the earth's spherical surface is made.

BRIEF SUMMARY OF THE INVENTION

In accordance with an embodiment of the present invention, a mobile communication device includes, in part, a first wireless receiver adapted to determine, as it travels along a path, a multitude of positions of the mobile communication device using signals received from a primary positioning source, a second wireless receiver adapted to receive signals from one or more ambient wireless sources as the mobile communication device travels along the path, and a module adapted to use the multitude of determined positions of the mobile communication device and the received ambient wireless signals to estimate positions of the ambient sources.

In one embodiment, the mobile communication device includes an internal memory or database operative to store estimated positions and corresponding time references of the signals of the one or more ambient sources. In another embodiment, the mobile communication device includes a transceiver that accesses and stores or retrieves estimated positions of the one or more ambient sources and their corresponding time references in an external memory or database. In one embodiment, the primary positioning source includes satellite based communication sources. In one embodiment, an ambient source includes digital television, digital radio transmission, or cellular based stations.

In one embodiment, the mobile communication devices is further adapted to estimate differential distances to the ambient sources and apply a trilateration technique to the estimated differential distances to estimate distances to the ambient sources and to determine the position of the mobile communication device. In one embodiment, the positions of the ambient sources are estimated using markers carried by signals transmitted by the ambient sources. In one embodiment, the positions of the ambient sources are estimated using one or more fields disposed in the frames transmitted by the ambient sources.

In accordance with one embodiment of the present invention, an external database is accessible to a multitude of communication devices and is adapted to store estimated positions of a number of ambient sources as well as corresponding times of markers transmitted by the ambient sources. The external database is further adapted to receive and store updates to the estimated positions as the estimates are generated. The external database is further adapted to supply estimates of the positions of the ambient sources as well as corresponding times of markers transmitted by the ambient sources to any another communication device that can gain access to the database. Such access enables a mobile device that has no access to a primary positioning signal to estimate its position using data stored in the external database.

A method of estimating positions of a number of ambient wireless sources, in accordance with one embodiment of the present invention, includes in part, determining a multitude of positions of a mobile communication device using signals received from one or more primary positioning sources as the mobile communication device travels along a path, receiving signals from one or more ambient wireless sources as the mobile communication device travels along the path, and estimating positions of the ambient sources using the determined plurality of positions and the received ambient wireless signals.

In one embodiment, estimated positions and corresponding time references of the one or more ambient sources are stored in an internal memory or database.

In one embodiment, the primary positioning source includes satellite based communication sources. In one embodiment, ambient sources include digital television, digital radio transmission, or cellular based stations.

In one embodiment, the estimated differential distances to the ambient sources are applied to a trilateration technique to generate estimates of distances to the ambient sources. In one embodiment, the positions of the ambient sources are estimated using markers carried by signals transmitted by the ambient sources. In one embodiment, the positions of the ambient sources are estimated using one or more fields disposed in the frames transmitted by the ambient sources. The estimated positions of the ambient sources are used to estimate the position of the mobile communication device.

DETAILED DESCRIPTION OF THE INVENTION

Figure 1:
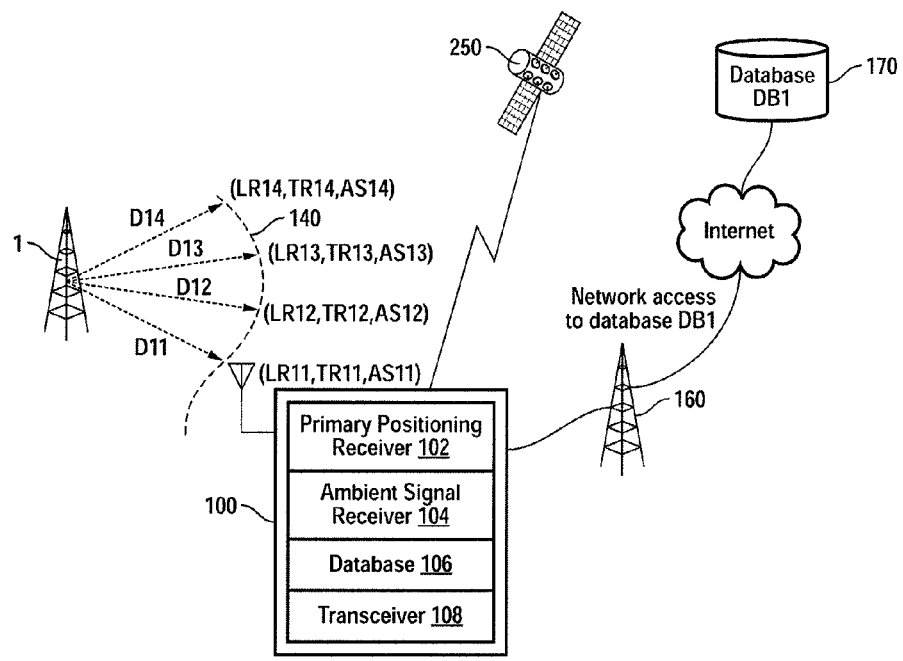
FIG. 1 shows a wireless receiver in communication with a primary positioning system, an ambient signal source, and internal an external databases, in accordance with one embodiment of the present invention.

In accordance with embodiments of the present invention, the position of a receiver traveling along a path is estimated using signals transmitted from digital radio or TV broadcasts, such as those conforming with DVB-T, DVB-H, ISDB-T, CMMB, MediaFLO, ATSC, DAB standards, signals transmitted from cellular phone systems, such as GSM, 3G, CDMA, W-CDMA, LTE, WiFi, WiMax, or the like, as well as any other sources of such signals that are synchronized to stable time bases and either do not know or do not broadcast their precise locations. All such signals are collectively referred to herein as ambient signals. Sources generating ambient signals are referred to as ambient sources. The positions estimated using ambient sources may be enhanced using signals transmitted from primary positioning systems such as the satellite based systems (e.g., GNSS, GPS). Signals transmitted by a satellite based system are collectively referred to as primary positioning signals. Sources generating primary positioning signals are referred to as primary positioning sources.

The following description of the exemplary embodiments of the present invention is provided with reference to an ambient signal transmitted from a DTV system and a primary positioning signal transmitted from a GNSS system. It is understood however that any other source of ambient signals and any other source of primary positioning signals may be used by embodiments of the present invention.

In accordance with embodiments of the present invention, a receiver establishes the positions of some or all of ambient sources whose signals are received by the receiver. The receiver subsequently uses positions of ambient sources (also referred to herein as ambient beacons or beacons) when the primary positioning system(s) becomes unavailable or is otherwise impaired. The positions of ambient beacons may be uploaded to a database or otherwise made accessible to other receivers within the range of the same ambient beacons to establish the receivers' positions without any need for the primary signals.

A receiver system (alternatively referred to herein as receiver), in accordance with one embodiment of the present invention, includes, in part, a receiver and a network-accessible database which exchanges information with the receiver. The receiver has access to the database through one or more wireless or wireline networks. The receiver is adapted to concurrently receive primary positioning signals as well as ambient signals. Such a receiver performs the following operations in accordance with embodiments of the present invention.

Using the primary positioning signal (e.g. the GNSS signals), the receiver establishes data corresponding to the receiver's positions and the associated times that the receiver was present in each such position (due, for example, to the natural motion of the receiver). Concurrently, since the receiver is also receiving ambient signals at each such position, the receiver also establishes time reference for each received ambient signal. Using this information, and as described further below, the receiver establishes the positions and corresponding time references associated with the ambient sources. The positions and corresponding time references of the ambient sources are uploaded to a database via one or more wireless or wireline networks or otherwise made available to other receiver systems. The positions and time references for the ambient sources may also be downloaded from the database or otherwise communicated to and used by a receiver which does not have access to a primary positioning source. Therefore, such a receiver despite not having access to primary positioning signals, is enabled in accordance with embodiments of the present invention, to estimate its position using only the ambient sources whose signals can be received by the receiver.

In the following description as well as in the Figures the following indexing convention is used. A quantity such as distance D, or receiver location LR, is typically indexed using two indices i and j, e.g. $D_{ij}$ or $LR_{ij}$. The first index i identifies the ambient source related to the quantity, and the second index j identifies the position of the receiver to the ambient source. For example, $D_{12}$ refers to the distance from ambient source 1 to the receiver position 2.

FIG. 1 shows a receiver 100 that includes a primary positioning receiver 102 as well as an ambient signal receiver 104. Primary positioning receiver 102, that may be a GNSS receiver, enables receiver 100 to estimate its positions and obtain the associated times that the receiver is present in each such position as is travels along the path 140 using the GNSS signals received from GNSS system 250. It is assumed herein that the estimated positions and the associated times obtained from the primary positioning receiver correspond substantially to the actual values of such positions and times. In one embodiment, receiver 100 has a database 106 that stores the positions and time values obtained using the primary positioning receiver 102 disposed in receiver 100. In another embodiment, receiver 100 includes a transceiver 108 enabling receiver 100 to store the position and time values obtained using the primary positioning receiver 102 in an external database 170 via network 160. Access to database 170 may be provided from network 160 using the Internet. Receiver 100 may operate in a number of different modes as described further below.

Ambient Source Localization

In this mode of operation, receiver 100 receives signals from both primary positioning sources as well as ambient sources. Receiver 100 uses the signals transmitted from the primary positioning source 250 to establish its position along a multitude of points while traversing path 140. Since receiver 100 is also in the range of one or more ambient sources, such as ambient source 1, as receiver 100 traverses along path 140, it receives from ambient source 1 signal $AS_{1i}$ at location $LR_{1i}$ at time $TR_{1i}$, where i is an integer varying from 1 to N. Receiver 100 then uses the position data obtained from the primary positioning source to determine the position of ambient source 1, as described further below. Receiver 100 uses the same technique to determine the position of any other source of ambient signals. It is understood that the signals from the primary positioning source and the ambient source need not be received simultaneously so long as receiver 100 has a time base which is relatively stable over short time intervals (such as a few seconds), as is widely available in consumer products today.

Figure 2:
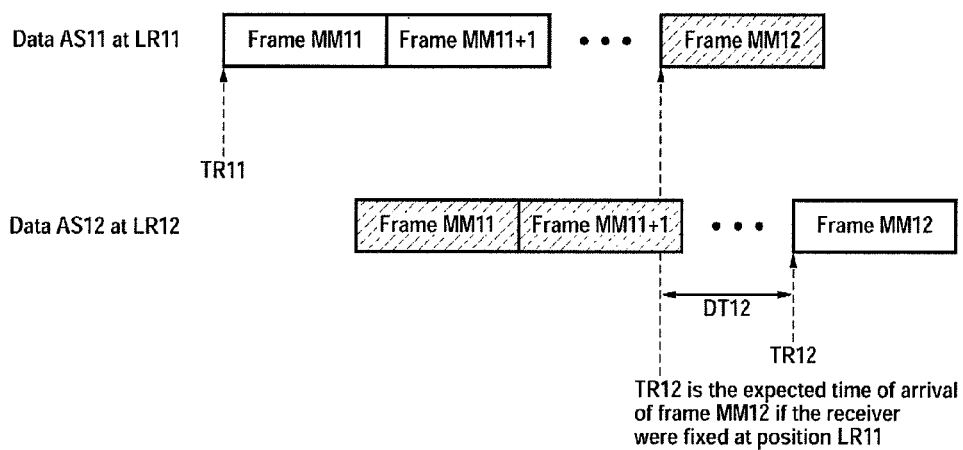
FIG. 2 shows a number of frames transmitted by an ambient source and received by the receiver at a number of locations.

To determine the position of ambient sources, the ambient sources are assumed to transmit their signals with markers $MM_{1i}$ (e.g., frame boundaries or any characteristics that occur in known locations within the frame) whose time intervals are known in advance in a predictable manner, as is the case with frame boundaries in many transmission protocols. FIG. 2 shows a number of frames transmitted by ambient source 1 as received by receiver 100. To determine the position of ambient source 1, receiver 100 is adapted to perform the following operations.

Referring to FIG. 2, frame boundary $MM_{11}$ of signal $AS_{11}$ transmitted by ambient source 1 is shown as being received by receiver 100 at time $TR_{11}$. Receiver 100 associates time $TR_{11}$ with position $L_{11}$. Time $TR_{12'}$ is the expected reception time of frame boundary $MM_{12'}$ if receiver 100 were to remain stationary at position $L_{11}$. Likewise, receiver 100 associates time $TR_{1i}$ at which signal $AS_{1i}$ is received with position $L_{1i}$, where index i identifies the position of the receiver. But since receiver 100 is assumed to be moving, it receives frame $MM_{12}$ at time $TR_{12}$ at position $LR_{12}$. The difference between times $TR_{12}$ and $TR_{12'}$, i.e., $(TR_{12}-TR_{12'})$ is shown in FIG. 2 as $DT_{12}$. The product of $DT_{12}$ and the speed of light in air represents the difference between $D_{12}$ and $D_{11}$, designated herein as $DD_{121}$. In general, for differential distance $DD_{ijk}$, index i corresponds to the ambient source, and indices j and k correspond to positions of the receiver. It is understood that frames $MM_{11}, MM_{11+1} \ldots$ are not actually received at position $LR_{12}$ and are only shown to indicate their relative expected reception times by receiver 100 at that location. Frames that are not received by receiver 100 and are only included to aid in understanding embodiments of the present invention are shown using diagonally hashed lines.

In a similar manner, for ambient source 1, the difference between $D_{1j}$ and $D_{1k}$ may be calculated to determine the differential distances $DD_{1jk}$. These differential distances and their associated locations $LR_{1j}$ and $LR_{1k}$ are subsequently used by well-known trilateration techniques to establish an estimate of the position ($LT_1$) of ambient source 1. It is understood that with more data points, estimated position $LT_1$ may be improved through filtering and other known noise reduction techniques. In a similar manner, the position LTi of any number of ambient sources may be obtained.

One example of an ambient source suitable for use in accordance with embodiments of the present invention is the GSM system in conformity with which a cellular base station transmits frames of data in regular, precisely-timed intervals. The frame boundaries of GSM signals may be used as markers. Another example is the DTV broadcast system in conformity with which digital data is broadcast in frames which are frequently synchronized to a system clock to implement what is commonly referred to as single-frequency networks (SFN). Broadcast towers of an SFN system covering a region transmit data in a synchronous fashion. The absolute time TTAi of transmission of the markers MMij can also be determined.

Once the position $LT_i$ of an ambient source i is estimated by a receiver, as described above, the receiver may store the position information in either or both databases 106 and 170, depending, for example, on their availability. Such information includes, among other things, the identity of the ambient source i, the position LTi of ambient source i, the absolute time TTAi associated with its marker MMij, time of upload of the data, confidence level, and any other statistics of the estimated data and ambient source, such as average offset of the ambient source.

Use of Ambient Sources to Establish Position

Figure 4:
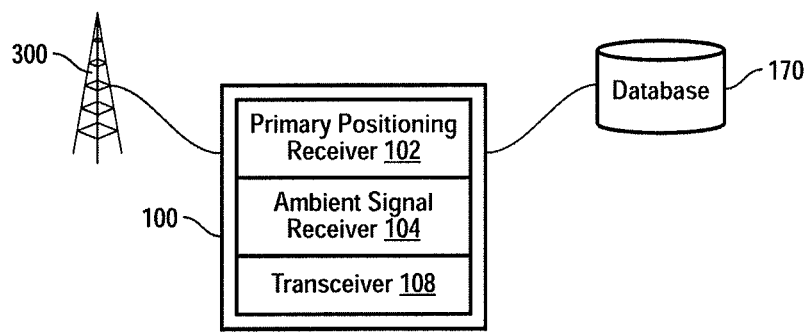
FIG. 4 shows a wireless receiver in communication with an ambient signal source and a databases, in accordance with one embodiment of the present invention.

In this mode of operation, receiver 100 detects and identifies ambient sources that are in its vicinity and whose signals are received by receiver 100. Receiver 100 retrieves the associated data and statistics for such ambient sources from its own database 106 or an external database 170, depending on their availability. The reception of signals from the ambient sources need not be simultaneous as long as receiver 100 maintains a time base which is relatively stable over short time intervals, as is widely available in mobile devices. With this information retrieved from such a database, receiver 100 may extract the difference in distances among the different ambient sources it is receiving signals from, and using the knowledge of their positions, trilaterates to determine the position of receiver 100, even in the absence of a GNSS signal or an accurate time estimate. FIG. 4 shows a receiver 100 that estimates its position using signals received only from ambient source 300 and external database 170.

Assisted Location

In this mode of operation, receiver 100 uses the information it retrieves from its own database 106 or an external database 170 about one or more ambient sources to compute the positions of such sources and further to improve the accuracy or the acquisition time of the signals received from the primary positioning source. Accordingly, in this mode the ambient sources are treated as additional primary sources. This information is delivered to a standard positioning engine which trilaterates the position of receiver 100. For example, relatively few base stations may be within the range of receiver 100. In such cases, the receiver may supplement the data received from the primary positioning source with data retrieved from internal database 106 or external database 170 to enable the positioning engine to improve the accuracy of the estimated position of the receiver.

Database Functions

In addition to receiving and storing the position, absolute transmission time of the markers, upload time and confidence (certainty) estimates from the receiver and subsequently permitting retrieval of this information, the database may also track information such as the relative stability of each ambient source over time (e.g. offsets or drifts). It may compute a more accurate estimate of the ambient source information using an ensemble of information obtained from a large number of receivers about these ambient sources.

Enhancements

Figure 3A:
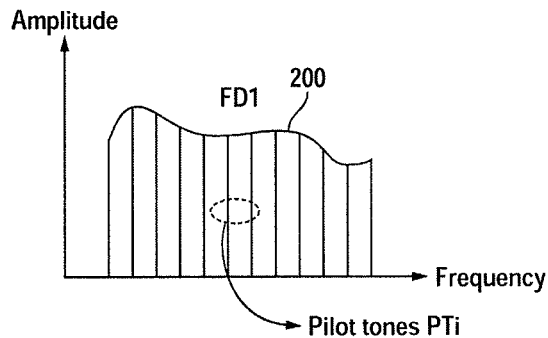
FIG. 3A shows an exemplary DTV signal received by a DTV receiver in frequency domain and used to locate positions in accordance with one embodiment of the present invention.
Figure 3B:
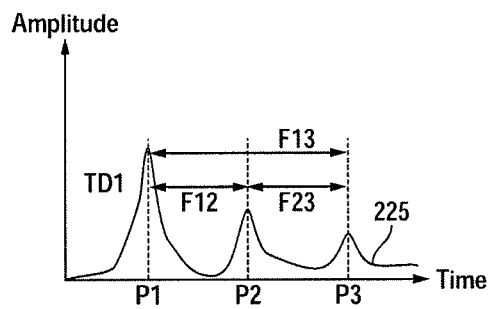
FIG. 3B shows the signal of FIG. 3A transformed into time domain and used to locate positions in accordance with one embodiment of the present invention.

The receiver may be enhanced to obtain more accurate estimates of the time of arrival of markers MMi. FIG. 3A shows a DTV signal received by a DTV receiver in the frequency domain. FIG. 3B shows the signal of FIG. 3A transformed into time domain in accordance with an embodiment of the present invention. The DTV receiver uses OFDM modulation and pilot tones PTi or training sequences, as defined by the DTV standards, to demodulate the DTV signal. The pilot tones PTi in the frequency domain may be used by the receiver to obtain a time-domain estimate of the channel impulse response 225 (shown in FIG. 3B) using an inverse FFT.

Referring to FIG. 3B, because of channel impairments such as multipath, the receiver may receive the ambient signal in a direct path at time P1 as well as echoes at P2 and P3. The receiver may use the pilot tones PTi, or training sequences commonly available in wireless transmission standards, to estimate the channel and extract P1 from the total signal, thereby obtaining a more accurate estimate for precise first time of arrival of markers MMij.

The DTV receiver system may be optimized for the purpose of location estimation, as described further below. The receiver may perform averaging, filtering and other noise-reduction techniques on the pilot tones PTi or training sequences to reduce the effective bandwidth of the receiver and thereby significantly increase its sensitivity. In the DTV standard, this involves averaging over the continuous and scattered pilot tones to sense transmission towers that are much farther than conventional TV reception ranges.

In a CMMB system, the signals present at the beginning of each frame includes two consecutive known symbols which can be used to obtain very long-distance, accurate estimates of differential distance among transmission towers. Furthermore, the receiver may switch frequencies and receive other DTV channels to obtain relative distance information at other frequencies to improve the estimation of the relative distance. This has the benefit of providing the system with a diverse range of signal sources, some of which may be stronger and more easily received.

The databases uses in accordance with embodiments of the present invention provide a number of other advantages, as described further below. A multitude of receivers may share access to the same external database, thereby building up a shared source of information regarding ambient sources. This allows users to benefit from collective knowledge of the positions of ambient sources without determining them independently. It also allows the accuracy and validity of the shared database to be checked and improved by data from a large number of users.

The sharing and further improvements of such a database enables receivers which do not have a built-in primary positioning receiver to determine their positions using other ambient source signals that they can receive to determine their positions accurately. The database can also be used to obtain statistical information concerning the positions of users of such a shared database and system at any given time. This information can be extremely valuable for the purposes of marketing, planning, or emergency services.

Furthermore, the timing and position information about ambient sources which are not adequately stable may be stored and updated in the shared database when the database is updated by a sufficient number of users. So long as the timing information about the less stable sources is updated with sufficient frequency to keep the accumulated timing error within bounds acceptable to a particular application, users within range of such less stable sources can use them as ambient signal sources for positioning purposes.

The above embodiments of the present invention are illustrative and not limiting. Various alternatives and equivalents are possible. The invention is not limited by the type or the number of primary positioning systems. The invention is not limited by the type or the number ambient sources. The invention is not limited by the rate used to transfer the data. The invention is not limited by the type of integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. A mobile communication device comprising:
   a first wireless receiver adapted to determine, as it travels along a first path, a first plurality of positions of the mobile communication device using signals received from a primary positioning source;
   a second wireless receiver adapted to receive signals from one or more ambient wireless sources as the mobile communication device travels along the first path;
   a positioning module adapted to use the determined first plurality of positions of the mobile communication device and the received ambient wireless signals to estimate positions of the ambient sources; said positioning module being further adapted to determine a second plurality of positions of the mobile communication device using the estimated positions of the ambient sources as the mobile communication device travels along a second path, wherein said positioning module estimates positions of the ambient sources using a time of arrival of a marker in the frequency domain carried by signals transmitted by the ambient sources; and
   a database operative to store the estimated positions and corresponding time references of the signals of the one or more ambient sources.

2. The mobile communication device of claim 1 further comprising a transceiver operative to transmit and receive estimated positions of the one or more ambient sources and their corresponding signal time references to and from an external database.

3. The mobile communication device of claim 1 wherein said primary positioning source comprises satellite based communication sources and wherein said ambient sources comprise digital television sources, digital radio sources and cellular phone sources.

4. The mobile communication device of claim 3 wherein said primary positioning source is selected from a group consisting of GNSS and GPS systems.

5. The mobile communication device of claim 3 wherein said ambient sources are selected from a group consisting of DVB-T, DVB-H, ISDB-T, CMMB, MediaFLO, ATSC, DAB, CDMA, W-CDMA, GSM, LTE, WiFi, and WiMax.

6. The mobile communication device of claim 1 wherein the module is further adapted to estimate differential distances to the ambient sources and apply trilateration technique to the estimated differential distances to estimate positions of the ambient sources.

7. The mobile communication device of claim 1 wherein said module estimates positions of the ambient sources using one or more fields disposed in frames transmitted by the ambient sources.

8. A system comprising:
   an external database accessible to a plurality of communication devices and adapted to store estimated positions of a plurality of ambient sources and associated time references of signals generated by the plurality of ambient sources, said external database further adapted to receive and store updates of the estimated positions and the associated time reference of the signals as the estimates are generated, said external database being further adapted to supply estimates of the positions of the ambient sources as well as the associated time references to the plurality of communication devices in order to enable the plurality of communication devices to estimate their positions using said supplied estimates of the positions and the associated time references, wherein the estimated positions of a plurality of ambient sources are provided by the plurality of communication devices, wherein a positioning module in each of the plurality of communication devices estimates positions of the plurality of ambient sources using a time of arrival of a marker in the frequency domain carried by signals transmitted by the ambient sources.

9. The system of claim 8 wherein each of the plurality of communication devices comprises a receiver receiving signals generated from one or more of said plurality of ambient sources and a transceiver for accessing the external database, each of the mobile communication devices operative to estimate its position using the signals received from the one or more ambient sources and the estimated position data stored in the external database.

10. A method comprising:
    determining a first plurality of positions of a mobile communication device using signals received from one or more primary positioning sources as the mobile communication device travels along a first path;
    receiving signals from one or more ambient wireless sources as the mobile communication device travels along the first path;
    estimating positions of the ambient sources using the determined first plurality of positions, the received ambient wireless signals, and a time of arrival of a marker in the frequency domain carried by signals transmitted by the one or more ambient sources;
    estimating a second plurality of positions of the mobile communication device using the estimated positions of the ambient sources as the mobile communication device travels along a second path; and
    storing estimated positions and corresponding time references of the one or more ambient sources in an internal database.

11. The method of claim 10 further comprising:
storing estimated positions and corresponding time references of the one or more ambient sources in an external database.

12. The method of claim 10 wherein said one or more primary position sources comprise satellite based communication sources and wherein said ambient sources comprise digital television, digital radio and cellular phone transmission sources.

13. The method of claim 10 wherein said primary position sources are selected from a group consisting of GNSS and GPS systems.

14. The method of claim 10 wherein said ambient sources are selected from a group consisting of DVB-T, DVB-H, ISDB-T, CMMB, MediaFLO, ATSC, DAB, CDMA, W-CDMA, GSM, LTE, WiFi, and WiMax.

15. The method of claim 10 further comprising:
estimating differential distances to the one or more ambient sources; and
applying a trilateration algorithm to the estimated differential distances to estimate positions of the ambient sources.

16. The method of claim 1 wherein said markers represent boundary frames.

17. The mobile communication device of claim 1, wherein said marker includes a plurality of pilot tones in the frequency domain carried by signals transmitted by the ambient sources, the positioning module being further adapted to transform the plurality of pilot tones from the frequency domain to the time domain.

18. The mobile communication device of claim 17, wherein said positioning module is further adapted to determine a time of arrival of a direct path signal transmitted by the ambient sources.

19. The system of claim 8, wherein said marker includes a plurality of pilot tones in the frequency domain carried by signals transmitted by the ambient sources, the positioning module being further adapted to transform the plurality of pilot tones from the frequency domain to the time domain.

20. The system of claim 19, wherein said positioning module is further adapted to determine a time of arrival of a direct path signal transmitted by the ambient sources.

21. The method of claim 10, wherein said marker includes a plurality of pilot tones in the frequency domain carried by signals transmitted by the ambient sources, the positioning module being further adapted to transform the plurality of pilot tones from the frequency domain to the time domain.

22. The method of claim 21, wherein said positioning module is further adapted to determine a time of arrival of a direct path signal transmitted by the ambient sources.

* * * * *